(12) United States Patent
Lopez Romano et al.

(10) Patent No.: US 11,084,212 B2
(45) Date of Patent: Aug. 10, 2021

(54) IMPRESSION CHAMBER FOR ADDITIVE MANUFACTURING OF HIGH PERFORMANCE PLASTICS

(71) Applicant: AIRBUS OPERATIONS SL, Madrid (ES)

(72) Inventors: Bernardo Lopez Romano, Madrid (ES); Enrique Guinaldo Fernandez, Salamanca (ES); Alvaro Jara Rodelgo, Madrid (ES); Guillermo Hernaiz Lopez, Madrid (ES); Alejandro Pico Bolaño, Madrid (ES); Fernando Garcia Mostoles, Madrid (ES)

( * ) Notice: Subject to any disclaimer, the term of this patent is extended or adjusted under 35 U.S.C. 154(b) by 119 days.

(21) Appl. No.: 16/223,976

(22) Filed: Dec. 18, 2018

(65) Prior Publication Data
US 2019/0184639 A1    Jun. 20, 2019

(30) Foreign Application Priority Data

Dec. 19, 2017    (EP) .................................... 17382866

(51) Int. Cl.
| | |
|---|---|
| *B29C 64/245* | (2017.01) |
| *B29C 64/118* | (2017.01) |
| *B33Y 30/00* | (2015.01) |
| *B29C 64/364* | (2017.01) |
| *B29C 64/25* | (2017.01) |
| *B29C 64/295* | (2017.01) |

(52) U.S. Cl.
CPC .......... *B29C 64/245* (2017.08); *B29C 64/118* (2017.08); *B29C 64/25* (2017.08); *B29C 64/364* (2017.08); *B33Y 30/00* (2014.12); *B29C 64/295* (2017.08); *B29K 2879/08* (2013.01); *B29K 2909/02* (2013.01); *B29K 2909/08* (2013.01); *B29K 2995/0015* (2013.01)

(58) Field of Classification Search
CPC ...... B29C 64/118; B29C 64/364; B29C 64/25
See application file for complete search history.

(56) References Cited

U.S. PATENT DOCUMENTS

2015/0217514 A1*   5/2015   Maier
2018/0200967 A1*   7/2018   Sutter .................. B29C 70/543

FOREIGN PATENT DOCUMENTS

WO              97/09125            3/1997

OTHER PUBLICATIONS

Extended Search Report for EP Application No. 17382866.6, dated Jun. 21, 2018, 7 pages.

* cited by examiner

*Primary Examiner* — Marc C Howell
*Assistant Examiner* — Asha A Thomas
(74) *Attorney, Agent, or Firm* — Nixon & Vanderhye P.C.

(57) ABSTRACT

An impression chamber (1) for a 3D printer (6) adapted to receive a high performance plastic filament (19) and including a print head (7) and a printing bed (8), wherein the impression chamber (1) includes a thermally insulated plate (2) and a polyimide film (3) attached to the plate (2) for delimiting a printing space (20). The plate (2) is dimensioned to have a surface (2a) equal or larger than the major surface of the piece (5) to be printed, and the film (3) is dimensioned to surround the printing bed (8). The plate (2) is provided with a first through-hole (15) for allowing the passage of at least part of the print head (7), so that the plate (2) is moved by the movement of the print head (7) and the film (3) is dragged by said movement providing a flexible impression chamber (1).

9 Claims, 4 Drawing Sheets

IMPRESSION CHAMBER FOR ADDITIVE MANUFACTURING OF HIGH PERFORMANCE PLASTICS

RELATED APPLICATION

This application claims priority to European Patent Application 17382866-6, filed Dec. 19, 2017, the entirety of which is incorporated by reference.

FIELD

The present invention relates to an impression chamber for additive manufacturing, and more specifically, for three-dimensional (3D) printing of high performance plastics according to a Fused Filament Fabrication process.

BACKGROUND 3D printing is a technique known for enabling a greater freedom to design and for reducing product development cycles, allowing rapid prototyping, piece production and mass customization.

Materials that may be used for 3D printing include high performance plastics, which often meet higher requirements than other standard or engineering plastics because of their better mechanical properties, higher chemical and/or higher heat stability. For these reasons, high performance plastics are being increasingly used in many demanding applications of aeronautical and automotive industries, in which the reliability and performance of the materials are of extreme importance.

High performance plastics for use as filaments for 3D printing include thermoplastics such as the PAEK (Polyaryletherketone) family which includes PEEK, PEKK and PAEK plastics; PEI (Polyetherimide), PPS (Polyphenylene sulfide), PARA (polyarylamide), and PA (poyamide). These high performance plastics typically have a high melting point in a range of 130 degrees Celsius to 400° C. (Celsius).

The use of these high performance plastics for Fused Filament Fabrication 3D printing requires reaching higher temperatures within the impression chambers for 3D printers, than is needed for other 3D printed filaments that have lower melting points. High performance plastics are typically 3D printed at temperatures in a range of 130° C. to 400° C. This range is hotter than the temperatures, such as 80° C., needed to 3D print other types of filaments, such as other engineering plastics. The higher temperature range is needed to heat high performance plastics to at or near their melting point which is needed to provide proper printing of the filament during 3D printing and good fusion of the filament with previously printed layers of the filament. The deposited hot filament is cooled in a control manner to avoid residual stressed in the printed piece as the piece cools. Excessive residual stresses may induce warping and loss of mechanical properties in the piece.

Controlling the temperature in impression chambers of 3D printers becomes more important, and in some cases, critical, when the melting temperature of the printed material is in the higher ranges needed for high performance plastic filaments. The impression chambers provide insulation and protection of the hot filament, the printer and the piece being printed.

Conventional 3D printers are housed in thermally protective and stationary impression chambers that protect the 3D printer and the printed piece. These housings typically enclose the entire printer including the electronic and mechanical elements which control the movement of the printer. For example, Patent Application Publications US2016039147A1 and US2004104515A1 disclose additive manufacturing systems for printing 3D parts that include heatable impression chambers in which all components of a 3d printer enclosed. However, enclosing all electronic and mechanical components of a 3D printer elements in large, stationary impression chambers is costly, bulky, complicates access to the 3D printer and requires all printer elements to withstand hot temperatures.

SUMMARY

There is a need for a technical solution that allow 3D printers to use high performance plastics in a cost-effective manner that provides proper and desired conditions for the 3D printing of high performance plastics.

The present invention may be embodied to overcome one or more of the above mentioned drawbacks by providing an impression chamber for a 3D printer that offers a simple and cost-effective solution for 3D printing of high performance plastics.

The impression chamber for 3D printing of high performance plastics may be capable of providing melting and cooling conditions for high performance plastic filaments and allow the printed piece to cool slowly so as to avoid warping due to residual stresses due portions of the piece cooling more rapidly than other portions.

The impression chamber for 3D printing of high performance plastics may leave exposes mechanic and electronic components of the 3D printer which need not be heated or protected in a chamber.

The impression chamber may be for a Fused Filament Fabrication 3D printer that is adapted to receive a high performance plastic filament, and comprising a print head movable for providing successive layers of fused filaments deposited to form a piece, and a printing bed for supporting said deposition of layers.

The impression chamber comprises a thermally insulated plate and at least one first polyimide film attached to the plate. The plate may be in a center area of the film, and the film may extend outward from the perimeter of the plate to form a skirt that covers the printed piece and a surrounding area of a printing bend. The plate and polyimide film delimit a printing space in which the high performance plastic piece is printed. The polyimide film is flexible and slides and folds as the print head moves during printing of the piece. The impression chamber formed by the plate and polyimide film forms a closed thermally insulated space above a print bed which retains heat and allows a printed piece to be slowly cooled after printing.

The plate may be dimensioned to have a surface area at least equal or larger than a horizontal surface area of the piece to be printed. The plate is large enough to entirely cover the piece. The plate may be insulated so that high temperatures at or near the print nozzle, in the heated filament and at the printed piece, do not reach mechanical and electrical components of the 3D printer above the plate.

The at least one first polyimide film may be dimensioned to surround the printing bed, or at least an area of the printing bed including and surrounding the printed piece. The polyimide film forms a skirt that, with the plate and printing bed, form a closed impression chamber for performing 3D printing.

The plate may include at least one first through-hole to receive at least part of the print head. The plate may be mounted to the print head. The plate is moved by the print head. The polyimide film attached to the plate also moves with the plate and print head. The flexibility of the polyamide film allows the film to slid, fold and otherwise be distorted by this movement. The outer edges of the polyamide film may be attached to the print bed or the polyamide film may be part of a flexible chamber, such as a bag, that encloses the print bed.

By providing a thermally insulated plate and at least one first polyimide film, a simple and economic impression chamber can be formed for a 3D printer for use in 3D printing using print materials formed of high performance plastics.

In addition, the thermally insulated plate is a simple and effective shield protecting the 3D printer. The insulated plate may be used instead of complex systems for protecting sensible mechanic and electronic components of the 3D printer.

Also, the impression chamber allows reaching melting conditions of high performance plastics and slows the cooling of the deposited material and printed piece. Thus, the impression chamber avoids the appearance of residual strengths in the printed piece, responsible for inducing warping and loss of mechanical properties in the printed piece.

SUMMARY OF DRAWINGS

For a better comprehension of the invention, the following drawings are provided for illustrative and non-limiting purposes, wherein.

DETAILED DESCRIPTION

Figure 1:
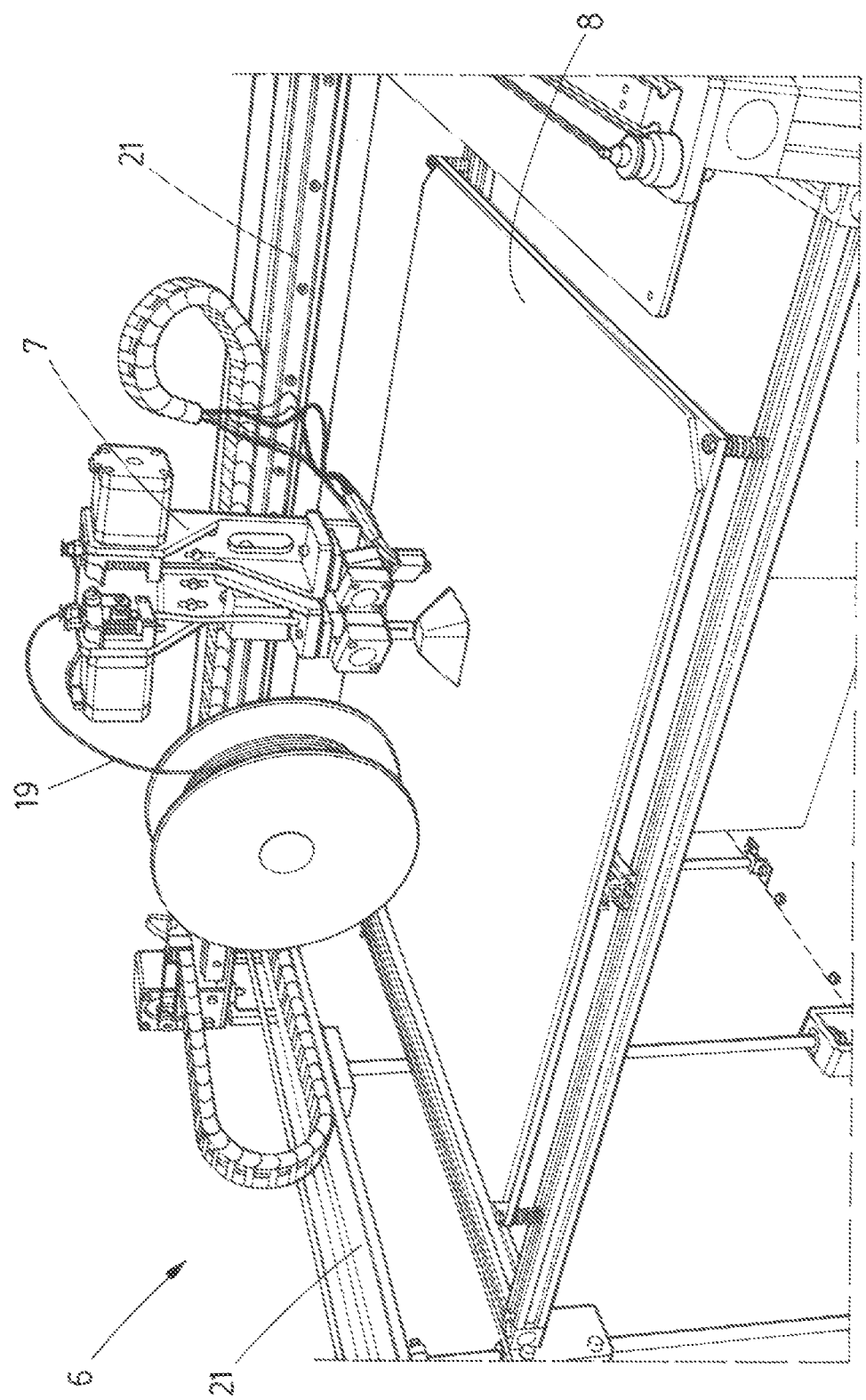
FIG. 1 shows a schematic perspective view of a state of the art Fused Filament Fabrication 3D printer adapted to use high performance plastics for 3D printing.

FIG. 1 shows a state of the art Fused Filament Fabrication 3D printer 6. As shown, the 3D printer 6 is adapted to receive and heat a high performance plastic filament 19 to form a high performance plastic fused filament which is used as the material that is 3D printed to form a piece 5, such as a device or a component of a device.

The 3D printer 6 includes a print head 7 that is positioned above a printing bed 8. The print head 7 is movable along longitudinal and transversal guides 21 over the printing bed. A high performance plastic filament 19 is fed to the print head 7. The print head 7 heats the filament to form a high performance fused filament that is printed in successive layers on the printing bed 8. The first layer may be directly on an upper surface of the printing bed, and the successive layers are on the previously printed layers and other portions of the upper surface of the printing bed. The fused filament is printed (deposition) by the print head. The printing bed 8 consists of an upper surface capable of supporting the deposition of layers for forming the piece 5. The print head 7 is moved longitudinally and transversal over the printing bed to deposit (print) the fused filament onto the upper surface of the printing bed and/or previously printed layers.

Figure 2:
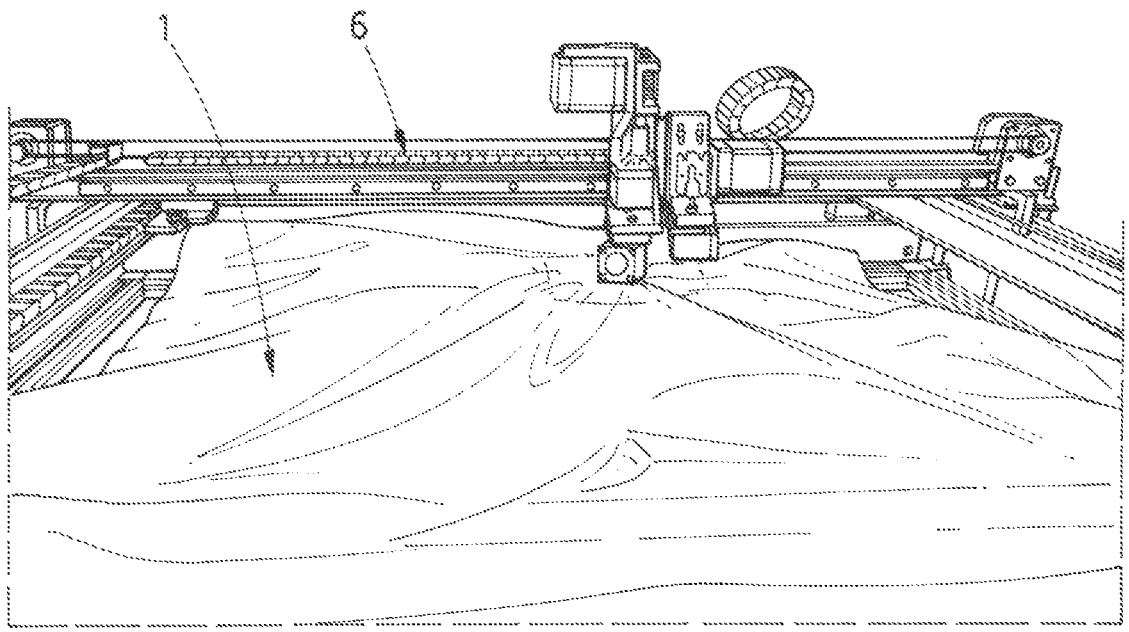
FIG. 2 shows a schematic perspective view of an impression chamber for the 3D printer shown in FIG. 1.
Figure 3:
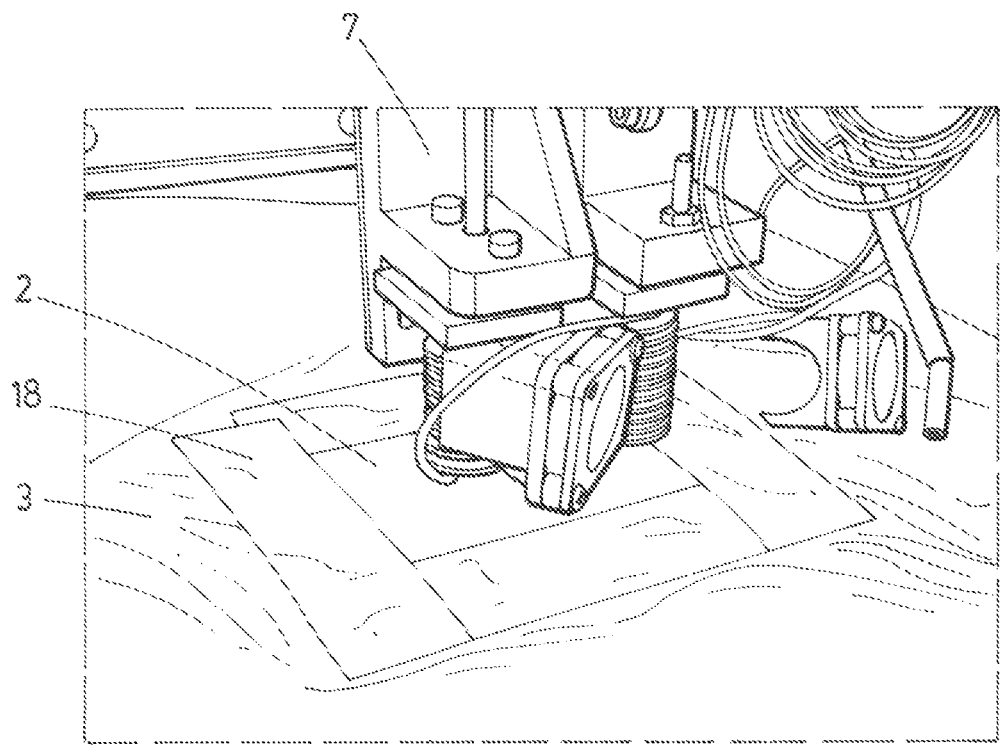
FIG. 3 shows a detailed view of the impression chamber shown in FIG. 2 in which a plate is attached to a first polyimide film to delimit the printing space.

FIG. 2 shows a perspective of an outer surface of an impression chamber 1 for the 3D printer 6. FIG. 3 is a close-up view of the attachment of the print head 7 to a plate 2 of the impression chamber 1 and the attachment of the plate 2 to the 3 polyamide film by polyimide adhesive strips (tapes) 18, such as Kapton adhesive tapes.

The plate 2 may be dimensioned to have a surface area 2a (see double headed arrow in FIG. 7) larger than a major surface area of the piece 5 in a plane parallel to the printing bed 8. The major surface area of the piece may be the entire surface area of the piece 5 in the plane parallel to the upper surface 8a of the printing bed 8.

Figure 7:
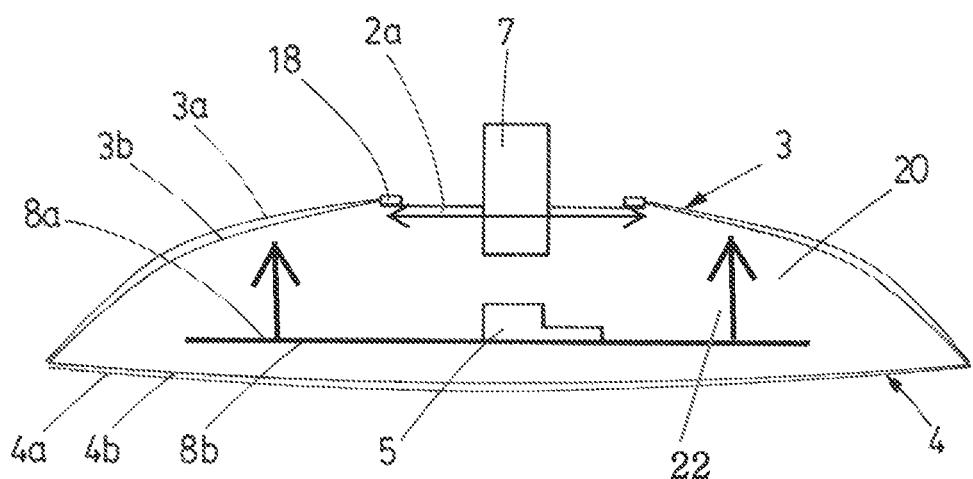
FIG. 7 shows a perspective view of an impression chamber comprising a plate, and first and second polyimide films to delimit the printing space.

The at least one first polyimide film 3, 4 is dimensioned to cover or surround the entire printing bed 8 as shown in FIG. 7. The at least one polyimide film 3, 4 with the plate 2 forms the impression chamber that covers a printing space above the printing bed and configured to print the piece 4. The at least one polyimide film 3, 4, may extend well beyond the horizontal edges of the print bed, such as by a distance at least equal to the horizontal dimensions of the piece. By leaving a horizontal gap at least as side as the piece 5 between the polyimide film(s) 3, 4, and the printing bed 8, the film(s) 3, 4, can move with the print head 7 without catching on the print bed.

The film 3, plate 2 and printing bed 8 form a printing space (volume) 20 which includes the piece 5 and the print head 7. The printing space 20 at least covers the major surface area of the piece 5 and at least a border area surround the piece on the print bed.

Figure 4:
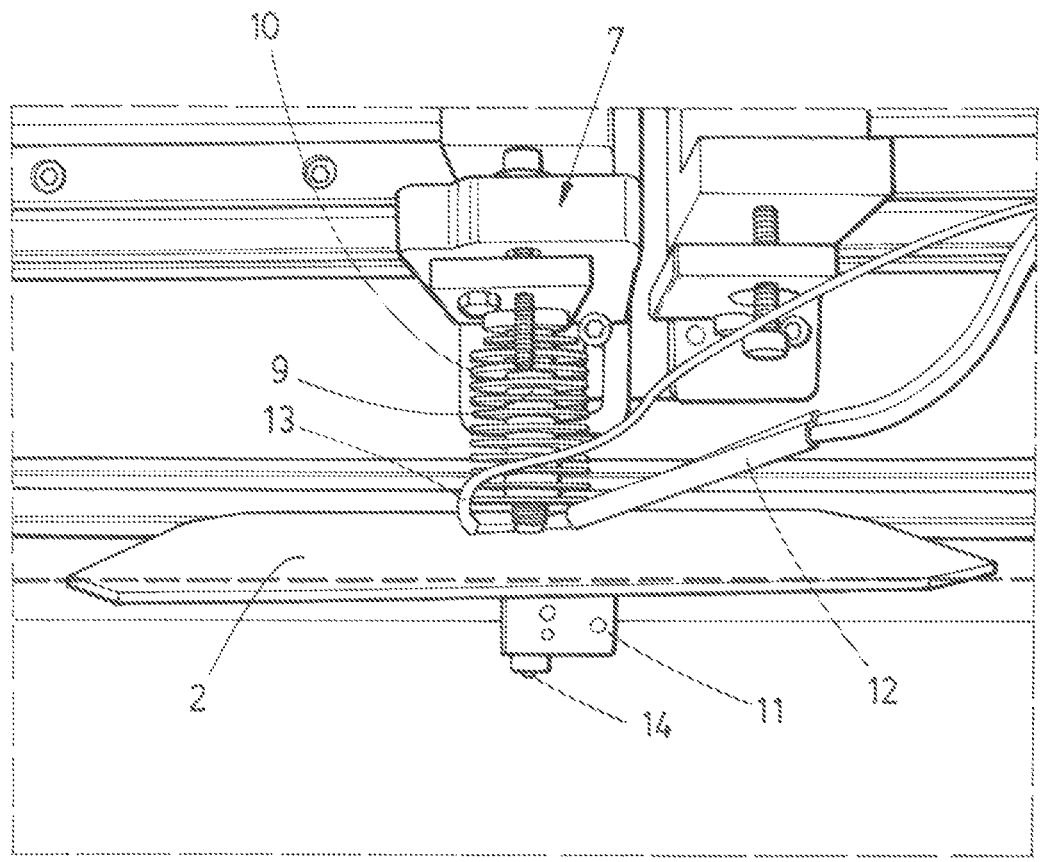
FIG. 4 shows a detailed view of the plate arranged between the heat sink and the heater block of the print head.
Figure 5:
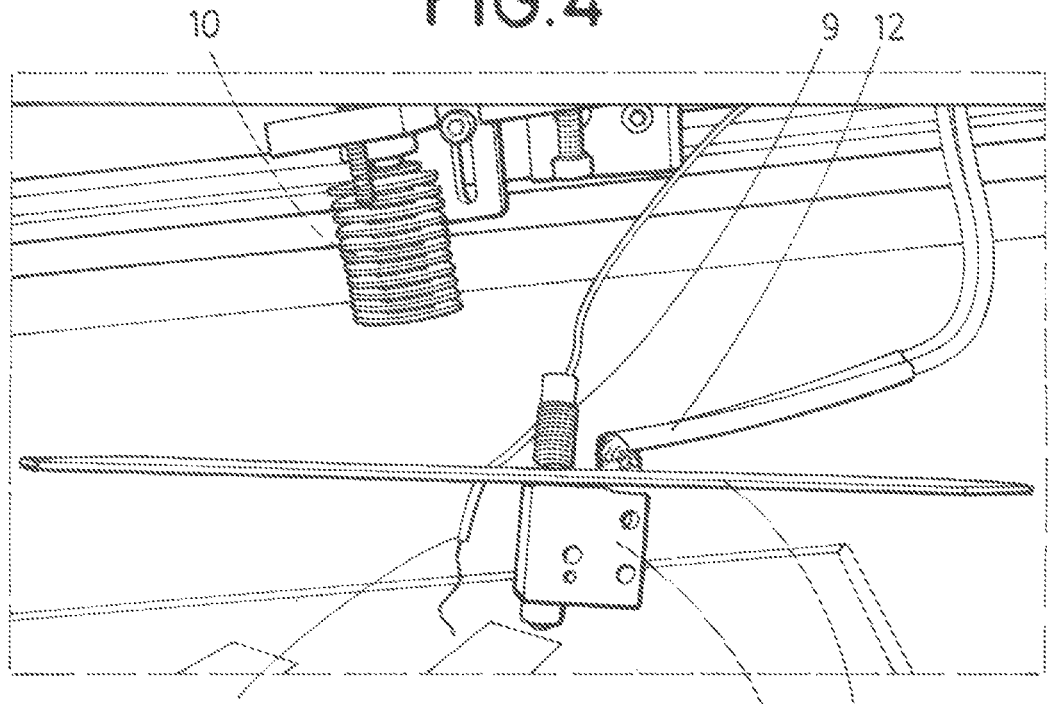
FIG. 5 shows a detailed view of the print head and the plate shown in FIG. 4 in which the heat break is decoupled from the heatsink.
Figure 6:
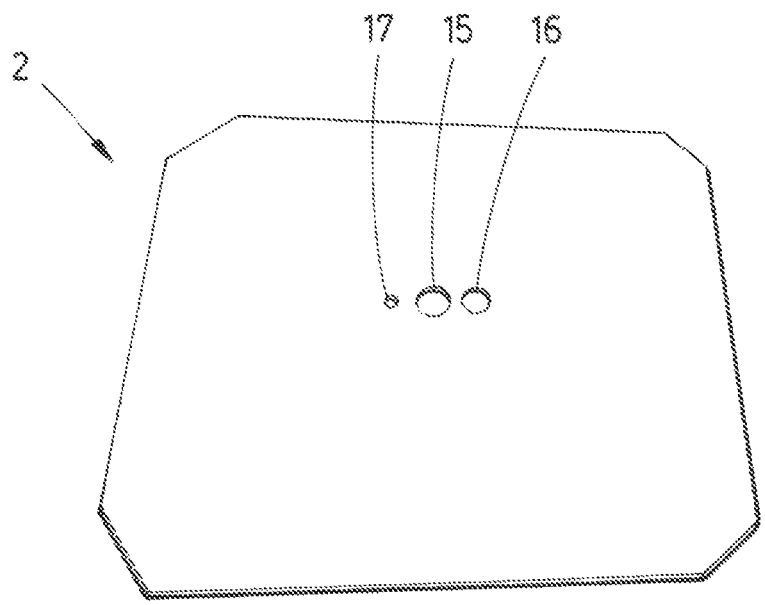
FIG. 6 shows a detailed view of a plate.

As shown in FIGS. 4, 5 and 6, the plate 2 includes at least one first through-hole 15 to receive at least part of the print head 7, such as the print nozzle 14. The plate 2 is mounted to and moves with the print head 7. The plate may be positioned on the inside of the film 3 and a hole in the film expose the plate and allows the print head 7 to be attached to the plate, as is shown in FIG. 3.

The print head 7 of the 3D printer 6 includes a heater block 11 that heats the plastic filament 19 to at or near its melting point as the filament flows through the nozzle 14 and is deposited on the print bed 8 or a previously deposited layer of filament material. The heater block 11 may be below the plate 2 and thus housed within the impression chamber 1 and in the printing space 20. Heat from the heater block 11 radiates into the printing space 20. Energy to heat the heater block 11 is provided by the heater cartridge 12 which is connected to a power source, such as via wires connected to electrical power. The heater block 11 applies sufficient heat to melt the filament to 19 and allow the filament to be printed such that it fuses with previously printed layer(s) of the piece. The heater block 11, and optionally a heating printed bed 3, heat the enclosed printing space 20 to keep the piece at an elevated temperature during the printing process and thereby slow the cooling of the printed piece.

As shown in FIGS. 4 and 5, a heat break 9 is on the print head 7 and is just above the heater 11 and nozzle 14. The heat break 9 may have an internal passage through which moves the filament to the nozzle. The heat break 9 dissipates heat flowing from the heater 11 towards upper portions of the print head 7. By dissipating the heat, the heat break 9 cools the print head 7 above the plate 2. A heat sink 10, such as an array of annular metallic fins, may be connected to and surround the heat break 9. The heat sink 10 transfers heat from the heat break 9 to the surrounding atmosphere.

As shown in FIGS. 6 and 7, the plate 2 has a first through hole 15 adapted to receive at least a portion of the print head 7. The plate may be fastened to the print heat 7 at the hole 14. A second through hole 16 is sized to receive the wires of the heater cartridge 12, and a third through hole 17 is sized to receive wires for a temperature sensor 13. The holes may be sealed with a putty or other sealing material once the holes receive the print head, heater cartridge and temperature sensor. The sealing material assists in keeping heat in the printing space 20.

The plate may be formed of a thermally insulating, e.g., non-conductive material, such as a ceramic, glass fiber or other insulating material. The plate keeps heat in the printing space 20 due to its insulating properties. The plate 2 is between the heat sink 10 and the heater block 11. Due to this arrangement, the plate shields from the heat of the heater block 11 thermally sensitive components of the 3D printer 6 which are above the plate. The plate 2 creates a thermal interface between a hot zone in the printing space 20 below the plate and a cold zone above the plate.

FIG. 5 shows a detailed view of the print head 7 wherein the heat break 9 is decoupled from the heat sink 10. The through hole 15 in the plate 2 may be sized to allow the heat break 9 fit in the hole 15.

The plate 2 may support a temperature sensor 13 that extends below the plate. The temperature sensor 13 is adapted to sense temperature. Temperature information sensed by the sensor 13 indicating a temperature of the printing space 20 may be used to control the energy applied by the heater cartridge 12 and the temperature of the heater block 11. The heater block encases the nozzle 14 to apply heat which heats the filament to a melting temperature as the filament material is ejected from the nozzle 14. The ejected material is deposited on the print bed or a previously deposited layer of the filament material. The ejected material fuses with the previously deposited layers. The temperature in the printing space 20 should be sufficient to allow newly printed piece to cool at a rate sufficiently slow to avoid excessive stresses form in the piece.

As shown in FIG. 7, the printing bed 8 of the 3D printer 6 has an upper surface 8a on which the piece 5 is to be printed. A lower surface 8b of the printing bed is opposite to the upper surface. The impression chamber 1 further comprises a second polyimide film 4 sealed along its edges to edges of the first polyimide film 3. The first polyimide film 3 is dimensioned to cover at least the upper surface 8a of the printing bed 8 and the second polyimide film 4 is dimensioned to cover at least the lower surface 8b of the printing bed 8. These two polyimide films 3, 4 with the plate 2 form the impression chamber 1 that delimits a printing space above the print bed 8.

The polyimide film 3, 4 may include layers such as at least one Kapton layer 3a, 4a. Layering the films improves the thermal insulating characteristics of the impression chamber 1. The Kapton layer 3a, 4a provides the required insulation by withstanding the high temperatures (around 130° C.) needed for the use of high performance plastic filament for 3D printing. Further, the Kapton layer allows seeing the formation of the piece due to its translucency.

The polyimide film 3, 4 may include a glass fiber layer 3b, 4b, which is inward of the Kapton layer 3a, 4a. The glass fiber layer 3b, 4b may be disposed towards or face the printing space 20. The layers of the Kapton layer 3a, 4a and the glass fiber layer 3b, 4b improves the thermal performance of the impression chamber 1 by increasing the capacity of the chamber to retain heat in the printing space 20. By slowing heat dissipation in the printing space 20, the rate of cooling is reduced of the printed piece. Slowing the rate of cooling, reduces the tendency of residual stresses and forces to form in the piece. Reducing this tendency reduces the deformation of the printed piece due to cooling and leading pieces with more regular geometry.

The polyimide films 3, 4 need not be fixed to the edges of the printing bed 8. The polyimide films form a flexible chamber 1 that allows the 3D printer 7 move in two or three Cartesian directions. When the print head 7 is moved towards its movement the limits over the printing bed 8, wrinkles may occur in the films 3, 4. These wrinkles do not collide with the printed part 5.

Additionally, tensor devices 22 within the print space and space from the piece may be used to avoid wrinkles and separate the polyimide film 3, 4 from the printing bed 8. The tensor devices may be mounted on the print bed.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention is:

1. An impression chamber for a three-dimensional (3D) printer adapted to receive a high performance plastic filament, wherein the 3D printer includes:
   a movable print head configured to print successive layers of fused filaments by depositing the high performance plastic filament in successive layers to form a piece, and
   a printing bed configured to support the piece during a 3D printing session;
   an impression chamber including a thermally insulated plate and at least one first polyimide film attached to the thermally insulated plate,
   wherein the thermally insulated plate and the at least one first polyimide film delimit a closed printing space over the printing bed and including the piece;
   wherein the plate is dimensioned to have a surface at least equal to or larger than a major surface of the piece;
   wherein the at least one first polyimide film is dimensioned to cover the printing bed to hold the printing bed within the closed printing space;
   wherein the plate is provided with at least one first through-hole configured to receive at least part of the moveable print head;
   wherein the plate is moved by movement of the print head and the at least one film polyimide film moves with the plate while covering the printing bed;
   wherein the printing bed includes an upper surface on which the piece is printed, and a lower surface opposite to the upper surface;
   wherein the impression chamber further comprises a second polymide film sealed to edges of the first polyimide film; and, wherein the first polyimide film covers at least the upper surface of the printing bed and the second polyimide film covers at least the lower surface of the printing bed.

2. The impression chamber for the 3D printer according to claim 1, wherein the movable print head of the 3D printer comprises:
   a heat break adjacent a passage for the high performance plastic filament,
   a heatsink adjacent the heat break and configured to cool the heat break, and
   a heater block attached to the heat break and configured to heat the high performance plastic filament moving through the passage towards a nozzle;
   wherein the at least one first through-hole in the plate is dimensioned to allow the heat break to pass so that the plate is positionable between the heat sink and the heater block.

3. The impression chamber for the 3D printer according to claim 2, wherein the 3D printer further comprises a heater cartridge configured to deliver energy to the heater block, and
   the plate comprises a second through-hole dimensioned to allow the heater cartridge to pass through the plate to be connected with the heater block.

4. The impression chamber for the 3D printer according to claim 2, wherein the 3D printer further comprises a temperature sensor configured to sense a temperature in the printing space, and
   wherein the plate comprises a third through-hole dimensioned to allow the temperature sensor to pass and be positioned in the printing space.

5. The impression chamber for the 3D printer according to claim 1, wherein the polyimide film comprises at least one Kapton layer.

6. The impression chamber for the 3D printer according to claim 5, wherein the polyimide film further comprises of a glass fiber layer, and the Kapton layer is disposed away from the printing space, and the glass fiber layer faces the printing space.

7. The impression chamber for the 3D printer according to claim 1, wherein the plate is made of at least one of a glass fiber and a ceramic.

8. The impression chamber for the 3D printer according to claim 1, wherein the at least one first polyimide film are attached to the plate by a polyimide adhesive tape.

9. The impression chamber for the 3D printer according to claim 1, further including tensor devices configured to separate the at least one first polyimide film from the printing bed.

* * * * *